INVENTORS.
LOWELL G. MOFFATT
FORREST C. PITTMAN

BY Burns, Doane, Benedict, Sweeker, & Mathis

ATTORNEYS.

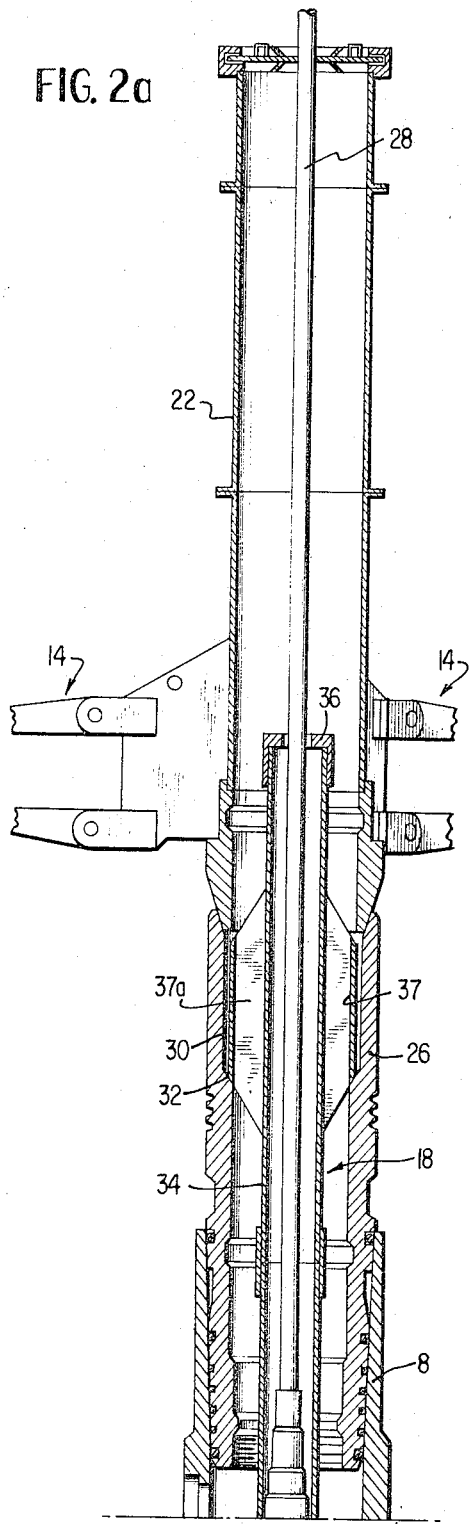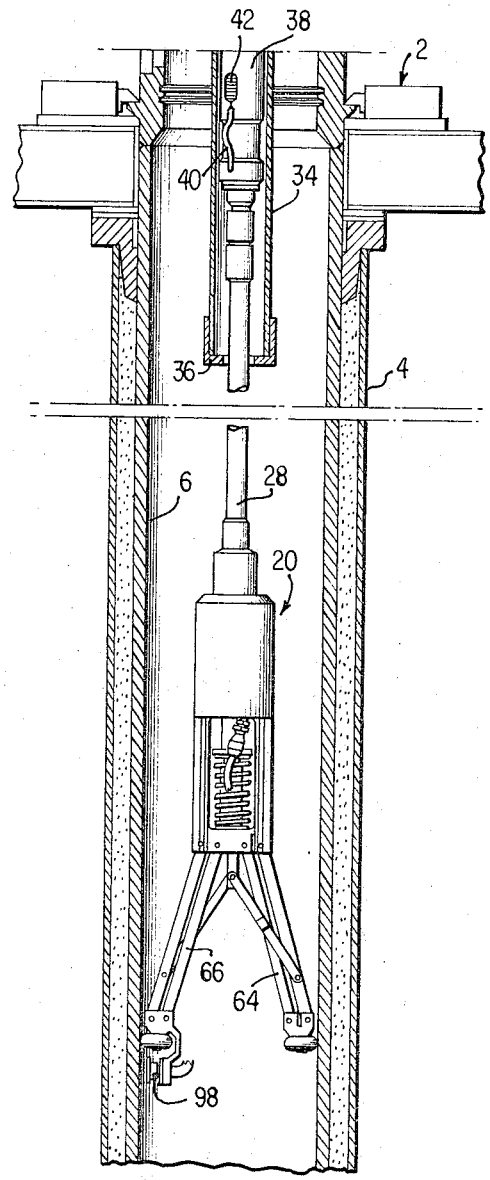

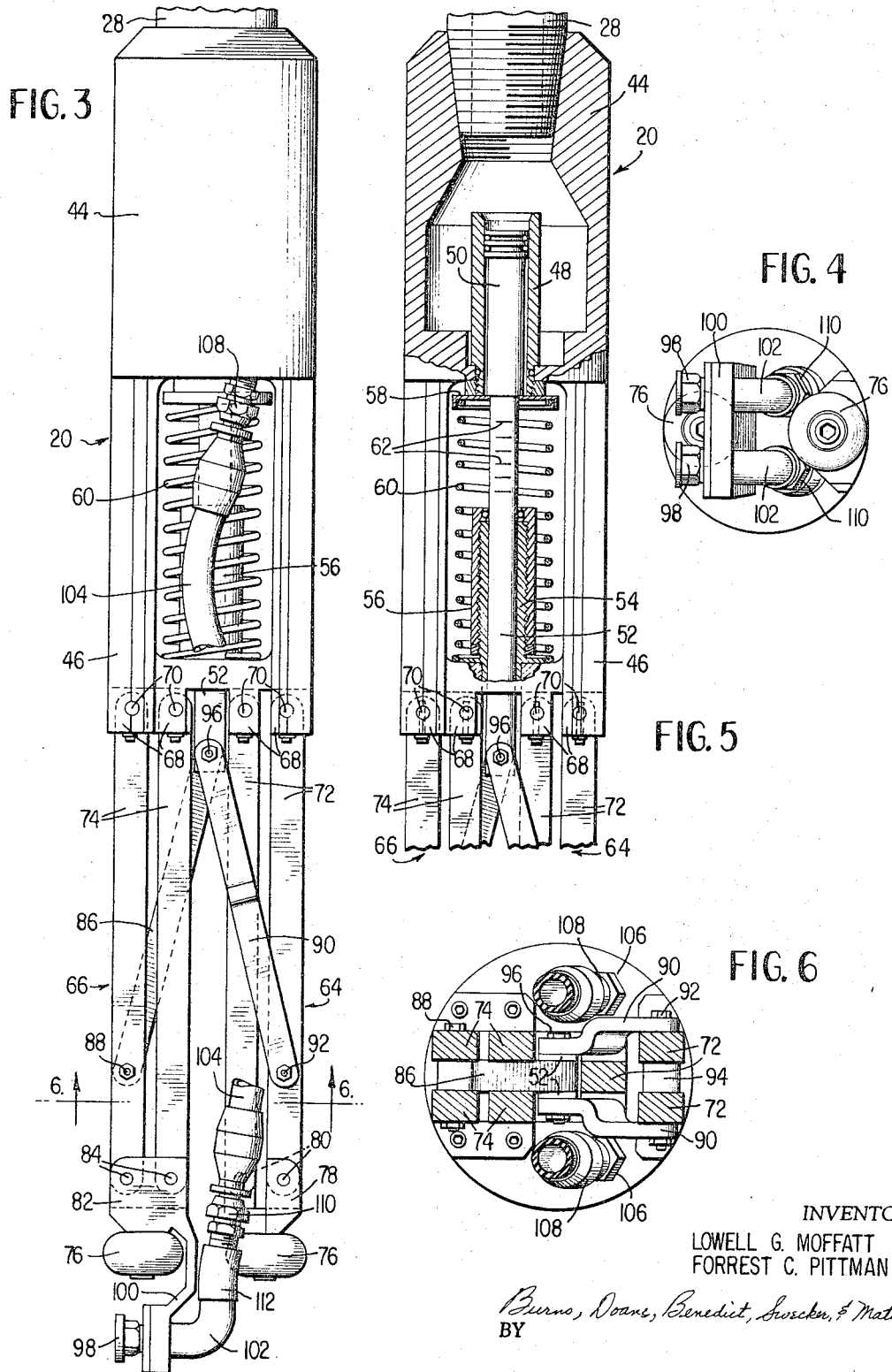

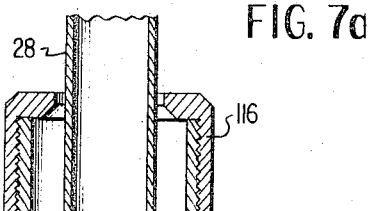
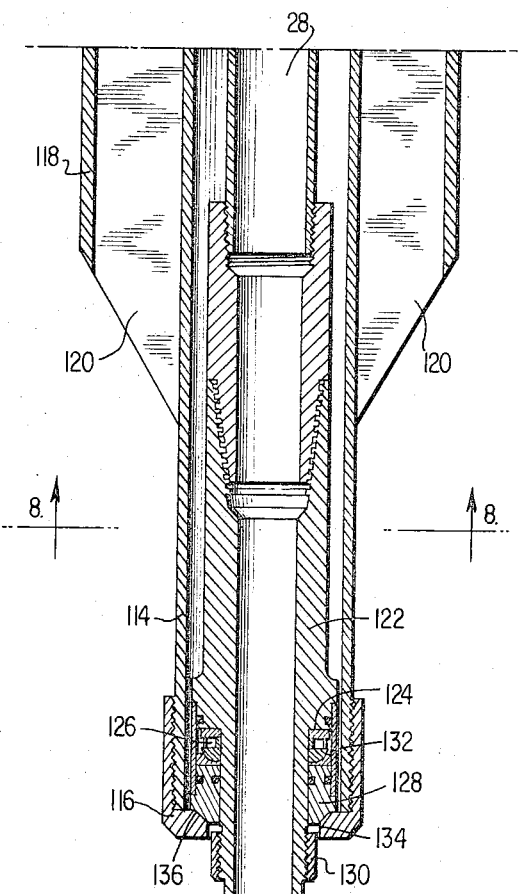
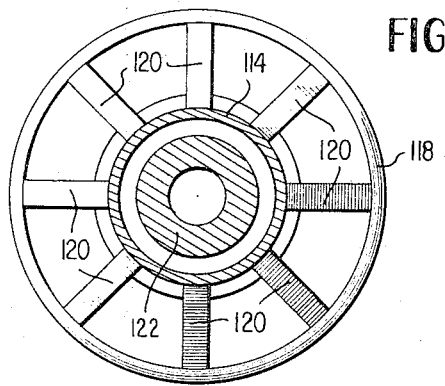

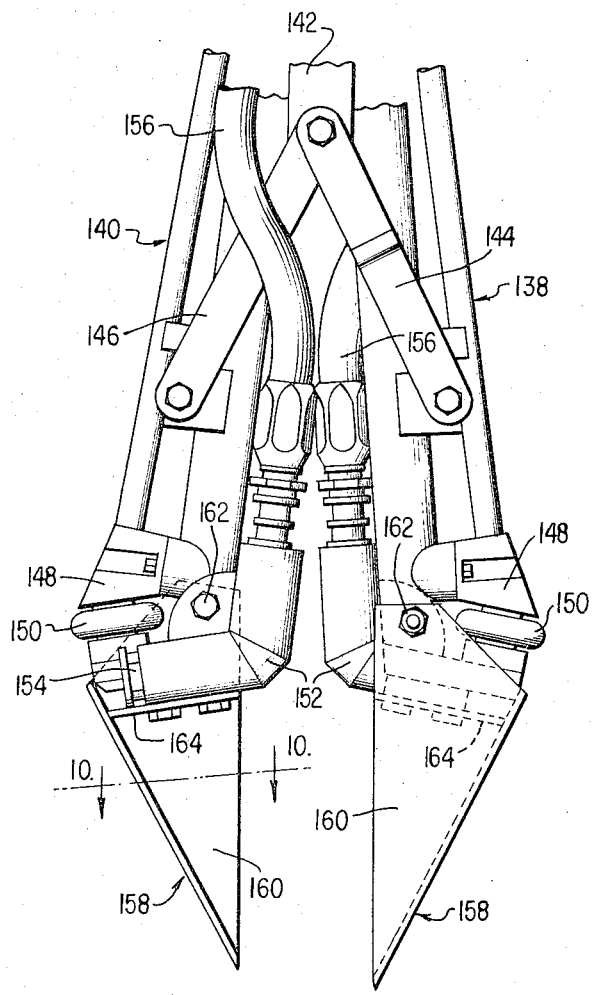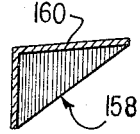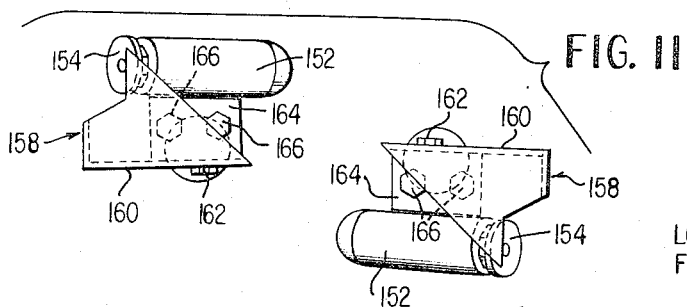

United States Patent Office 3,338,305
Patented Aug. 29, 1967

3,338,305
METHOD AND APPARATUS FOR CUTTING CASING IN UNDERWATER INSTALLATIONS
Forrest C. Pittman, Duncan, Okla., and Lowell G. Moffat, Lubbock, Tex., assignors to Halliburton Company, Duncan, Okla., a corporation of Delaware
Filed Feb. 5, 1965, Ser. No. 430,627
17 Claims. (Cl. 166—35)

ABSTRACT OF THE DISCLOSURE

Apparatus and method for cutting casing, particularly in underwater drilling operations, wherein the cut-off tool has folding arms that expand outwardly in response to the fluid pressure of the jetting fluid. The arms are spring biased toward a folded position. Nozzles on the ends of the arms remain perpendicular to the casing, since the arms include a parallelogram device. A landing ring assembly may be used to fix the depth of the tool in the casing. A swivel in the landing ring is selectively anchored to the ring to adjust the position of the tool relative to the ring.

Background of the invention

This invention relates to underwater well drilling, and more particularly, to a method and apparatus for cutting a casing in an underwater formation.

In underwater drilling operations, it occasionally becomes necessary to sever a casing or other conduit means which has been set in the underwater formation. A conventional underwater installation may include a guide and anchor structure which supports a casing head and a blow-out preventer. The drilling rig may be mounted on a floating barge which is anchored over the drilling location. Cables or other guide means extend from the barge to the guide and anchor structure for guiding tools into the casing.

In order to cut the casing in a horizontal plane, it is necessary to prevent the cut-off from rising and falling relative to the casing during the cutting operation. This is difficult to accomplish, however, since the barge floats up and down on the waves at the surface of the water and the distance between the casing head and the floating barge does not remain constant. Consequently, the cut-off tool must be fixed in depth with respect to the casing head rather than the barge. Furthermore, the length of the tubing string cannot be used to locate the position of the cut, as is the practice in onshore installations.

Very often, the casing has a larger diameter than the casing head or the blow-out preventer, if one is used. A conventional hydraulic cut-off tool includes a nozzle for directing a high pressure jet of fluid against the casing. The nozzle must be positioned close to the casing wall to be effective. Due to the restricted diameter of the casing head and the blow-out preventer, however, a conventional cut-off tool of the proper diameter for cutting the casing may not have a sufficiently small diameter to pass through the casing head and the blow-out preventer. Conversely, a conventional cut-off tool of a sufficiently small diameter to pass through the casing head and the blow-out preventer may be so much smaller than the internal diameter of the casing that the nozzles are spaced so far from the casing wall that they are ineffective.

Accordingly, it is an object of this invention to provide an improved method and apparatus for cutting casing.

It is a further object of this invention to provide a method and apparatus for cutting casing having a substantially larger internal diameter than the casing head.

It is a still further object of this invention to provide a method and apparatus for positioning an underwater cut-off tool relative to the casing in such a manner that it is not affected by wave motion.

It is another object of this invention to provide a method and apparatus for positioning a cut-off tool in an underwater installation at predetermined depth with respect to the casing.

Summary of the invention

These objects are accomplished in accordance with a preferred embodiment of the invention by a cut-off tool having folding arms. Jet nozzles are mounted on the ends of the arms and by a parallelogram arrangement, the nozzles remain substantially perpendicular to the casing. The movement of the folding arms is effected by the hydraulic pressure of the jetting fluid. The cut-off tool is secured to the end of a tubing string. A swivel or a thrust bearing is installed in the tubing string and positioned above the cut-off tool. The swivel or thrust bearing is enclosed within a landing ring assembly, which includes a hollow tube for supporting the swivel or thrust bearing. A landing ring is rigidly secured to the exterior of the tube for seating the landing ring in the casing head. If a tubing anchor swivel is used, slips on the swivel are selectively expanded to engage the interior of the hollow tube for fixing the position of the swivel with respect to the landing ring. If a thrust bearing is used, the thrust bearing is supported on a cap on the lower end of the hollow tube when the landing ring is seated on the casing head.

When the tubing string is lowered toward the casing head, it is guided by conventional cables extending from the guide and anchor structure to the barge. The cut-off tool arms are in their collapsed position, so that the diameter of the cutting tool is less than that of the casing head or the blow-out preventer. The cut-off tool passes through the casing head and into the casing, and the landing ring on the hollow tube which houses the swivel or thrust bearing, seats in the casing head. Sufficient weight is imposed on the tubing to maintain the landing ring seated in the casing head and the thrust bearing in engagement with the end cap on the hollow tube. When jetting fluid is pumped down the tubing string, the arms swing outwardly to a predetermined position adjacent the casing wall. Rotation of the tubing string causes the tool to rotate in the casing, and the wall of the casing is cut by the fluid streams issuing from the nozzles. When the supply of jetting fluid is cut off, the arms retract to their original position and the tubing string may be raised out of the casing.

Description of the drawings

This preferred embodiment of the invention is illustrated in the accompanying drawings in which:

FIG. 2a is an enlarged cross sectional view of the underwater guide and anchor structure showing the landing ring of this invention seated in a conventional casing head;

FIG. 2b is an enlarged cross sectional view of the lower portion of the guide and anchor structure showing the landing ring assembly and cut-off tool in the casing;

FIG. 3 is a side elevational view of the cut-off tool of this invention;

FIG. 4 is a bottom plan view of the cut-off tool;

FIG. 5 is a side elevational view, partially in section of the upper portion of the cut-off tool;

FIG. 6 is a cross sectional view of the cut-off tool along the line 6—6 in FIG. 3;

FIG. 7a is a cross sectional view of the upper portion of a modified form of the landing ring assembly;

FIG. 7b is a cross sectional view of the lower portion of a modified form of the landing ring assembly showing a thrust bearing supported therein;

FIG. 8 is a cross sectional view of the modified form of the landing ring assembly along the line 8—8 of FIG. 7b;

FIG. 9 is a side elevational view of a modified form of the cut-off tool of this invention, having guides on the ends of the arms;

FIG. 10 is a cross sectional view of one of the guides along the line 10—10 in FIG. 9; and FIG. 11 is a bottom plan view of the modified form of the cut-off tool of FIG. 9.

Description of the preferred embodiments

Figure 1:
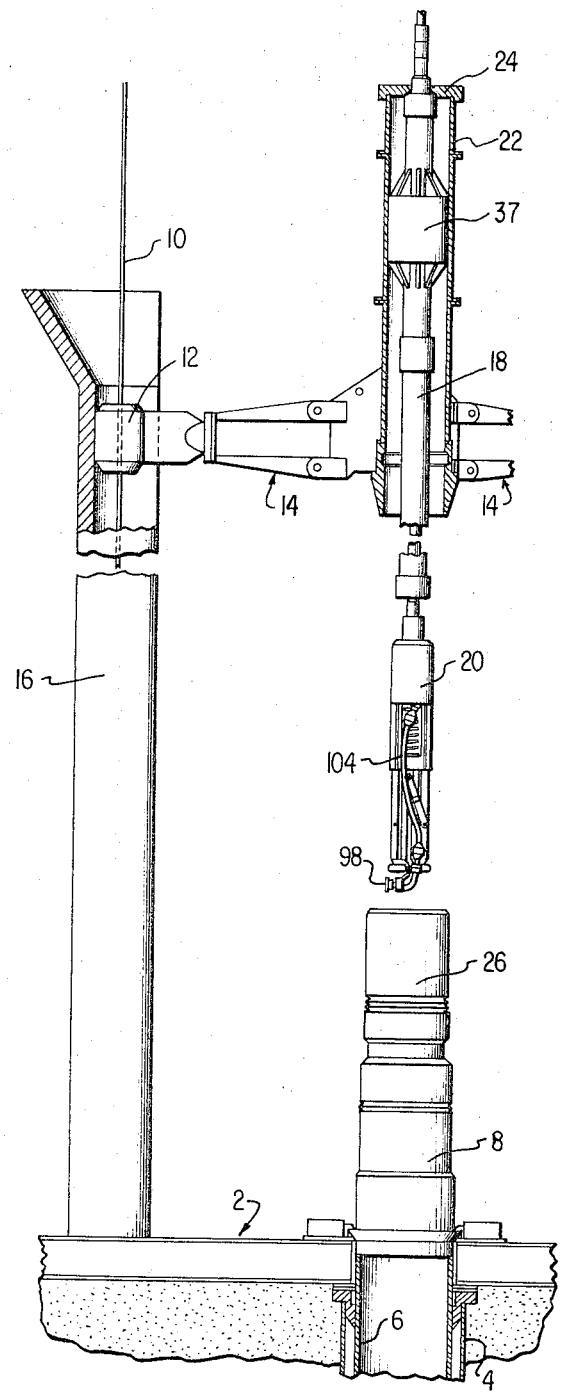
FIG. 1 is an elevational view of the underwater guide and anchor structure, showing the cutting tool of this invention being guided into the casing.

Referring to FIG. 1, it is customary in drilling underwater wells or exploratory holes to anchor a barge over the drilling site. A guide and anchor structure 2 is then lowered from the barge and placed on the surface of the underwater formation. A short drive pipe 4 may be attached to the structure 2 and driven into the underwater formation while the structure 2 is being placed in position. A foundation pipe or casing 6 may be installed in the drive pipe 4 and a casing head 8 is secured to the structure 2 at the top of the foundation casing 6. A conventional blowout preventer, not shown, may be installed in the casing head 8.

A conventional drilling barge has a rotary table and a tubing string may be made up on the barge and suspended for rotation by the rotary table. Usually a plurality of guide cables 10 extend between the structure 2 and the barge. A bushing 12 rides on each cable 10 and arms 14 connect the bushing 12 with the tubing string. Usually, at least two guide cables 10 are provided for centering the tubing string and guiding it into the top of the casing head. A guide column 16 is provided around the lower end of the cable 10 to assure that the tool is guided accurately into the casing head 8. The upper end of the guide column 16 is flared outwardly to receive the bushing 12. By this arrangement, a tool may be guided accurately into the open end of the casing head.

The casing cut-off apparatus of this invention includes a landing ring assembly 18 and a cut-off tool 20. As shown in FIG. 1, a utility guide adapter 22 is mounted over the landing ring assembly 18, and a cover 24 on the upper end of the guide adapter 22 is seated on the upper end of the landing ring assembly 18. The arms 14 connect the guide adapter 22 with their respective bushings 12, for centering the guide adapter over the open end of the casing head 8. A suspension body 26 is telescoped in the casing head 8 for receiving the landing ring assembly 18.

When the tubing string is lowered into the casing 6, as shown in FIGS. 2a and 2b, the utility guide adapter 22 is seated in the chamfered upper end of the suspension body 26 and the landing ring assembly 18 slides through the guide adapter 22 and becomes seated in the suspension body 26. The upper portion of the suspension body has an enlarged internal bore 30, forming a sloping shoulder 32. The landing ring assembly includes an elongated tube 34 having threaded caps 36 on each opposite end with central openings through which the tubing string 28 extends, and a hollow cylindrical ring 37 which is rigidly secured to the tube 34 by a plurality of radial webs 37a. The lower ends of the webs 37a are inclined to facilitate entry of the ring 37 into the upper end of the suspension body 26. The ring 37 centers the tubing string 28 in the casing 6.

A conventional tubing anchor swivel 38 is assembled in the tubing string and is enclosed within the tube 34. The swivel 38 has drag springs 40 which engage the tube 34 and retractable slips 42 which, when expanded, tightly grip the tube 34 to prevent longitudinal or rotational movement of the swivel 38 relative to the tube 34. The position of the swivel 38 may be selected with respect to the tube 34 to position the cut-off tool 20 at the desired depth in the casing 6. The swivel 38, in cooperation with the landing ring assembly 18 centers the tubing string 28 in the casing and allows rotation of the cut-off tool 20 in the casing 6.

Referring particularly to FIGS. 3 to 6, the cut-off tool 20 of this invention includes a hollow body 44 which is internally threaded at one end to receive the threaded end of the tubing string 28. Extending downwardly from the hollow body 44 is a frame 46. A cylinder 48 is rigidly mounted in the hollow body, with one open end in communication with the interior of the body 44 and the opposite end extending through the wall of the hollow body 44. A piston 50 is mounted in the cylinder 48 for reciprocation and a piston rod 52 has one end connected with the piston 50. The opposite end of the piston rod 52 is journaled in a sleeve 54 which is mounted in the frame 46. The sleeve 54 is externally threaded to receive an internally threaded cap 56.

A disc 58 is mounted on the piston rod 52 and abuts against the shoulder between the piston 50 and the piston rod 52. The disc 58 is urged against the piston 50 by a coil spring 60 having one end retained within a peripheral flange on the disc 58 and the opposite end restrained by a portion of the frame 46. Accordingly, the spring 60 urges the piston 50 to be displaced away from the end of the cap 56. Movement of the piston 50 toward the cap 56 is limited by the engagement of the disc 58 with the adjacent end of the cap 56. The limit of displacement of the piston 50 may be adjusted by turning the threaded cap 56. Unscrewing the cap shortens the stroke of the piston 50. To facilitate adjustment of the cap 56, gage lines 62 may be scribed on the piston rod 52.

At the lower end of the frame 46, a pair of arms 64 and 66 are hingedly mounted on the frame 46. A plurality of bearing portions 68 are provided on the frame 46 for supporting the arms 64 and 66. Hinge pins 70 are secured in the bearing portions by any suitable means. Each of the arms 64 and 66 includes a pair of struts 72 and 74, respectively. As shown in FIG. 6, there are preferably four struts 74 forming the arm 66. Each strut 74 has one end mounted for swinging movement on a hinge pin 70. The arm 64 is preferably formed of three struts, each of which is mounted for swinging movement on one of the hinge pins 70.

The lower end of each arm 64 and 66 carries a roller 76. The roller 76 on the arm 64 is journaled in a bracket 78 which is hingedly mounted on the end of each of the struts 72 by pins 80. The spacing between the pins 80 is substantially the same as the distance separating the pins 70 at the opposite end of the arm 64. The struts 72, together with the bearing portions 68 and the bracket 78 form a parallelogram structure. Similarly, the roller 76 on the other arm 66 is mounted for rotation on a bracket 82 at the lower end of the arm 66. The bracket 82 is connected with the struts 74 by pins 84 to permit the struts to swing with respect to the bracket 82. The parallelogram structure of the arms 64 and 66 causes the rollers 76 to remain substantially perpendicular to the casing wall as the arms swing apart.

Movement of the arms 64 and 66 is effected by a toggle linkage which is connected with the piston rod 52. The lower end of the piston rod 52 is bifurcated to receive one end of the lever 86. The opposite end of the lever 86 is journaled on a pin 88 extending between the struts 74 of the arm 66. A pair of levers 90 have one end attached to the piston rod 52 and the opposite end journaled on a bolt 92 which extends through both of the outer struts 72, as shown in FIG. 6. A cylindrical spacer 94 maintains the separation between the struts 72 through which the bolt 92 extends. The ends of the levers 90 and the end of the lever 86 are attached to the piston rod 52 by a bolt 96 which extends through the respective levers and through the bifurcations in the piston rod 52.

Jet nozzles 98 are rigidly mounted on the arm 66 so that the position of the nozzles relative to the central axis of the tool may be adjusted by moving the arm. As shown in FIGS. 3 and 4, a mounting plate 100 extends downwardly from the bracket 82 and around the roller 76. The nozzles 98 are mounted in holes extending through the plate 100, and a pair of elbows 102 extending outwardly on the opposite side of the plate communicates individually with the nozzles 98. A flexible hose 104 conducts fluid from the interior of the hollow body 44 into each elbow 102. Internally threaded passages 106 extend through the wall of the hollow body 44 and communicate with the chamber therein, and a threaded coupling 108 on the end of each hose 104 is received in the respective passages 106. A coupling 110 on the opposite end of each hose 104 is received in an internally threaded collar 112 on each elbow 102.

In operation, the tubing string is made up, as shown in FIG. 1, with the tubing anchor swivel 38 inside the landing ring assembly 18 and with the cut-off tool 20 secured to the lower end of the string. The slips 42 of the tubing anchor swivel 38 are initially retracted. The tube 34 is supported on the upper end of the swivel 38 and the utility guide adapter 22 is supported on the upper end of the tube 34 while the tool is being lowered along the cables 10. When the ring 37 of the landing ring assembly 18 becomes lodged on the shoulder 32, the downward movement of the tubing string 28 continues until the tubing anchor swivel 38 engages the bottom cap 36 on the tube 34. The distance between the swivel 38 and the cut-off tool 20 is known, and therefore the depth of the tool in the casing is known when the ring 37 is seated on the shoulder 32 and the swivel 38 is in engagement with the lower cap 36. The swivel 38 is then raised a predetermined distance with respect to the tube 34. The slips 42 are then expanded in accordance with conventional practice. Usually it is necessary to move the swivel 38 downwardly relative to the tube 34 for several inches to cause the slips 42 to grip the tube tightly. Therefore, the swivel 38 should be raised off the cap 36 a sufficient distance to allow for downward displacement in setting the slips.

While the cut-off tool 20 is being lowered along the cables 10 and through the casing head 8, it is in collapsed position, as shown in FIGS. 1 and 3. The effectiveness of the jet issuing from the nozzles 98 varies inversely with the distance between the nozzles and the casing 6. Accordingly, it is necessary to displace the nozzles outwardly to a position adjacent the surface of the casing 6. This is accomplished in accordance with this invention by pumping conventional jetting fluid down the tubing string 28 and into the chamber in the hollow body 44 of the cut-off tool 20. The pressure of the jetting fluid in the chamber is sufficiently great to overcome the force of the spring 60 and to displace the piston 50 downwardly against the end of the cap 56. This movement of the piston 50 also displaces the piston rod 52 and causes the levers 86 and 90 to swing the arms 68 and 70 outwardly, as shown in FIG. 2b.

When the tubing string is being made up, the position of the cap 56 is adjusted with respect to the sleeve 54 to limit the outwardly swinging movement of the arms 64 and 66 to a span slightly less than the diameter of the casing 6. This is particularly important, since the casing 6 is not always exactly circular. The casing 6 may be slightly out of round and as the tool 20 rotates, with the arms spread to the maximum diameter of the casing, the arms may bind and resist turning as they approach the minimum diameter of the casing.

Jetting fluid is conducted under high pressure to the interior of the hollow body 44 through the tubing string 28. From the interior of the body 44 fluid flows through the hoses 104 to the nozzles 98. The jetting fluid has a sufficiently high pressure to displace the piston 50 and swing the arms 64 and 66 outwardly toward the casing 6. While the jetting fluid is flowing out of the nozzles in a high pressure stream, the tubing string is rotated slowly and the stream issuing from the nozzles 98 cuts the casing 6. Any conventional jetting fluid may be used, such as water mixed with sand or other abrasive.

When the cut has been completed, the flow of jetting fluid is stopped, and the piston 50 is returned to the position shown in FIG. 5 by the spring 60. This movement of the piston 50 draws the arms 64 and 66 back to the position shown in FIG. 3, by means of the piston rod 52. The slips 42 of the swivel 38 may then be retracted and the cut-off tool 20 and the tubing anchor assembly 18 may be raised to the surface. If the ring 37 should become stuck in the enlarged bore 30 of the suspension body 26, a jarring action may be achieved by pulling up on the tubing string to move the swivel 38 into engagement with the upper cap 36. The impact of the swivel on the cap 36 should be sufficient to release the landing ring assembly 18 from the suspension body 26.

A modified form of the landing ring assembly is illustrated in FIGS. 7a, 7b and FIG. 8. The modified landing ring assembly includes an elongated tube 114 which is threaded on opposite ends to receive internally threaded caps 116. A cylindrical ring 118 extends around the tube 114 and is secured thereto by a plurality of radial webs 120. A mandrel 122 inside the tube 114 has one end internally threaded to receive the tubing string 28. A radial shoulder 124 is formed on the mandrel 122 and a thrust bearing 126 abuts against the shoulder 124. The thrust bearing 126 is held in position on the mandrel by a sleeve 128 which is telescoped on the mandrel 122. The thrust bearing 126 preferably has a spherical seating ring as shown in FIG. 7b, so that it is self-centering. The sleeve 128 is restricted from sliding off the mandrel by means of a collar 130 which is threaded on the mandrel 122. A cover 132 extends between the sleeve 128 and the mandrel 122 to protect the thust bearing. The lower cap 116 has a central opening 134 through which the mandrel extends and the interior edge of the cap opening is chamfered to correspond to a sloping face on the sleeve 128. The opening 134 is sufficiently large to allow the collar 130 to pass through the opening. The remainder of the tubing string 28 and the cut-off tool 20 are assembled in the same manner as shown in FIGS. 1 and 2.

In operation, the modified landing ring assembly may be substituted for the assembly 18 shown in FIG. 1. While the string is being lowered along the cable 10, the upper cap 116 abuts against the upper end of the mandrel 122 to support the tube 114. When the cylindrical ring 118 becomes seated in the enlarged bore 30, as shown in FIG. 2a, the mandrel 122 moves downwardly relative to the tube 114 until the sleeve 128 engages the lower cap 116. Since the distance between the thrust bearing mandrel 122 and the jet nozzles 98, and the distance between the casing head shoulder 32 and the mandrel 122 are known, the depth of the nozzles with respect to the casing 6 can be fixed accurately, when the mandrel 122 is in the position shown in FIG. 7b.

While the jetting fluid is being conducted to the nozzles 98, the tubing string is rotated. At the same time, sufficient weight is imposed on the thrust bearing 126 to overcome the tendency for the sleeve 128 to lift off the cap 116 as the barge rides up and down on the waves. In this manner, the thrust bearing and the landing ring assembly compensate for wave motion and assure that the jet nozzles 98 remain at the desired depth throughout the cutting operation. The cut-off tool may be raised to the surface merely by lifting up on the tubing string, which causes the mandrel 122 to move upwardly through the tube 114 until it engages the upper cap 116. Upon contact with the upper cap 116, the mandrel 122 lifts the landing ring 118 out of the enlarged bore 30, so that the tubing string can be raised to the surface. The mandrel 122 may be used as a jar in the same manner as the swivel 38, as previously described.

A modified form of the arm and nozzle structure is illustrated in FIGS. 9 to 11. The arms 138 and 140 are hingedly mounted on the frame of the cut-off tool in a similar manner as that shown in FIGS. 3 and 5. Movement of the arms 138 and 140 is effected by a piston rod 142 which corresponds to the piston rod 52, as shown in FIGS. 3 and 5. Toggle levers 144 and 146 interconnect the piston rod 142 with the respective arms 138 and 140. A bracket 148 is mounted on the lower end of each arm 138 and 140. Each bracket 148 has a roller 150 journaled therein in the same manner as the rollers 76, as shown in FIG. 3. An elbow 152 is secured to the lower end of each arm 138 and 140. The elbows 152 correspond to the elbows 102, shown in FIG. 3. A nozzle 154 is mounted in each elbow 152 for directing a fluid stream outwardly for cutting a casing. Jetting fluid is supplied to each nozzle 154 through a hose 156 which is connected with the interior of the cut-off tool body.

At the lower end of each arm 138 and 140, a guide point 158 is provided for guiding the cut-off tool into the open end of the casing head and through the restricted sections of the casing head and the blow-out preventer. The guide points 158 have a right angular cross section, as shown in FIG. 10, which contributes to the rigidity of the points. One side 160 of each point 158 is secured to the lower end of each of the arms 138 and 140, respectively, by a bolt 162. A brace plate 164 extends outwardly between the sides of the point and the plate 164 is secured to the lower end of the respective arms 138 and 140 by bolts 166.

As shown in FIGS. 9 and 11, the nozzles 154 are spaced inwardly from the projecting portion of the wheels 150 to prevent the nozzles from engaging the casing. The guide points 158 also protect the nozzles as they enter the casing head and pass through the blow-out preventer. The portion of the guide points adjacent the nozzles is cut away so that it does not interfere with the high pressure stream issuing from the nozzle.

In cutting large diameter casing which is provided with a casing head or a blow-out preventer having a substantially smaller diameter than the casing, a conventional cut-off tool with a diameter small enough to pass through the casing head may have its nozzles spaced too far from the casing surface to cut the casing effectively. The cut-off tool of this invention overcomes this problem and allows the tool to pass through a restricted portion of the casing head and then the position of the nozzles is adjusted radially according to the particular size of the casing.

The use of the landing ring assembly permits a downward load to be imposed on the tubing string to prevent vertical displacement of the cut-off tool which might otherwise be caused by wave motion. The landing ring assembly has the advantage of maintaining the nozzles of the cut-off tool a predetermined depth with respect to the casing. The distance between the casing head and the point in the casing at which the cut is made corresponds to the distance between the ring of the landing ring assembly and the cut-off tool nozzles. If it should be necessary to remove the cut-off tool before a cut is completed, the cut-off nozzles can be repositioned at the same depth.

While this invention has been illustrated and described in several embodiments, it is recognized that variations and changes may be made therein without departing from the invention as set forth in the claims.

We claim:

1. A cut-off tool comprising a body having a central axis, a nozzle, means mounting said nozzle on said body, means for selectively displacing said nozzle outwardly relative to said central axis, means for limiting the displacement of said nozzle by said displacing means, said limiting means being adjustable, and means for conducting fluid to said nozzle, whereby the position of the nozzle may be adjusted according to the internal diameter of a conduit means which is to be cut.

2. A cut-off tool comprising a body having a central axis, a nozzle, an arm mounted on said body, means mounting the nozzle on said arm, means for swinging said arm selectively toward and away from said central axis, means for adjusting the limit of movement of said arm away from said central axis, a roller on said arm adjacent said nozzle, and means for conducting fluid to said nozzle, whereby the position of the nozzle may be adjusted according to the diameter of a conduit means which is to be cut.

3. A cut-off tool comprising a body having a central axis, a nozzle, an arm mounted on said body, means for swinging said arm selectively toward and away from said central axis, means mounting the nozzle on said arm, means on said arm for maintaining said nozzle substantially perpendicular to said central axis during swinging movement of said arm, and means for conducting fluid to said nozzle, whereby the position of the nozzle may be adjusted according to the diameter of a conduit means which is to be cut.

4. A cut-off tool comprising a body having a central axis and having a chamber therein, means for securing said body to a tubing string, a nozzle, an arm mounted on said body for swinging movement toward and away from said central axis, means mounting the nozzle on said arm, a piston mounted for reciprocating movement in said body, one side of said piston being in communication with said chamber, lever means connecting said piston and said arm for swinging said arm relative to said central axis, means for limiting the movement of said arm away from said central axis to a predetermined distance, a roller on said arm adjacent said nozzle, and means for conducting fluid from said chamber to said nozzle, whereby fluid in the chamber displaces the piston and swings the arm away from the central axis of the body.

5. A cut-off tool comprising a body having a central axis and having a chamber therein, means for securing said body to a tubing string, a nozzle, a pair of arms mounted on said body for swinging movement toward and away from said central axis, means mounting the nozzle on one of said arms, a piston mounted for reciprocating movement in said body, one side of said piston being in communication with said chamber, toggle means connecting said arms and said piston for swinging the arms relative to said central axis, means for maintaining said nozzle substantially perpendicular to said central axis during swinging movement of said arms, means for biasing said arms toward said central axis, and means for conducting fluid from said chamber to said nozzle, whereby fluid supplied to the chamber under pressure displaces the piston to move the nozzle away from the central axis of the body.

6. A cut-off tool comprising a body having a central axis and having a chamber, means for securing said body to a tubing string, a nozzle, a pair of arms mounted on said body for swinging movement toward and away from said central axis, means mounting the nozzle on one of said arms, a piston mounted for reciprocating movement in said body, one side of said piston being in communication with said chamber, toggle means connecting said arms and said piston for swinging said arms, means for maintaining said nozzle substantially perpendicular to said central axis during swinging movement of said arm, means for biasing said arms toward said central axis, means for limiting the swinging movement of said arms away from said central axis, means for biasing said arms toward said central axis, and means for conducting fluid from said chamber to said nozzle, whereby fluid supplied to the chamber under pressure displaces the piston to move the nozzle away from the central axis of the body of predetermined distance and when the fluid pressure in the chamber is reduced, the arms are retracted.

7. A cut-off tool comprising abody having a central axis and having a chamber, means for securing said body to a tubing string, a nozzle, a pair of arms mounted on said body for swinging movement toward and away from said central axis, means mounting the nozzle on one of said arms, a piston mounted for reciprocating movement in said body, one side of said piston being in communication with said chamber, toggle means conecting said arms and said piston for swinging said arms, said arms each including a pair of struts, means mounting each strut independently on said body for swinging movement toward and away from said central axis, one of each pair of struts being between the other of said struts and said central axis, a pair of links, one of said links extending between the struts of each arm and spaced from said strut mounting means, means for conducting fluid from said chamber to said nozzle, whereby fluid supplied to the chamber under pressure displaces the piston to move the nozzle away from the central axis of the body, and the parallelogram formed by the struts and links of each arm maintains the nozzle substantially perpendicular to said central axis during swinging movement of said arms.

8. A cut-off tool comprising a body having a central axis and having a chamber, means for securing said body to a tubing string, a nozzle, an arm mounted on said body for swinging movement, means mounting the nozzle on said arm, said body having an opening therein, a tube mounted in said opening in communication with said chamber and extending along said central axis, a piston mounted for reciprocating movement in said tube, a piston rod having one end secured to the piston, a sleeve on said body for supporting said piston rod for longitudinal movement, means for swinging said arms toward and away from said central axis in response to longitudinal displacement of said piston rod, means biasing said arms toward said central axis, said sleeve being spaced from said tube, a cap on the sleeve, means for adjusting the cap axially relative to the sleeve, and means for conducting fluid from said chamber to said nozzle, whereby said cap limits longitudinal displacement of the piston rod and thereby limits the outward movement of the arms.

9. A cut-off tool comprising a body having a central axis and having a chamber, means for securing said body to a tubing string, a nozzle, a pair of arms mounted on said body for swinging movement, said body having an opening therein, a tube mounted in said opening in communication with said chamber and extending along said central axis, a piston mounted for reciprocating movement in said tube, a piston rod having one end secured to the piston, a sleeve on said body for supporting said piston rod for longitudinal movement, said arms each including a pair of struts, each strut being independently mounted on said body for swinging movement toward and away from said central axis, one of each pair of struts being between the other of said struts and the central axis, a lever extending between one of the struts of each arm and said piston rod, each arm having a link interconnecting the struts, means for mounting said nozzle on one of said links, means for biasing the arms toward the central axis, said sleeve being spaced from said tube, a cap on the sleeve, means for adjusting the cap axially relative to the sleeve, and means for conducting fluid from said chamber to said nozzle, whereby fluid under pressure in said chamber displaces the piston toward said cap thereby swinging said arms outwardly by said levers for positioning the nozzle adjacent the surface of a casing which is to be cut.

10. A landing ring assembly for underwater installations wherein a casing with a casing head is set in the underwater formation comprising an elongated tube, means forming a ring on the exterior of said tube, caps on opposite ends of the tube, said caps each having an opening therein, a mandrel in said tube, means for securing tubing in opposite ends of said mandrel, means for selectively fixing the axial position of said mandrel relative to said tube, and means in said mandrel for rotating said tubing relative to said tube, whereby the mandrel is made up in a tubing string and the ring is seated on a shoulder in said casing head for positioning the tubing string with respect to the casing and centralizing the tubing string in the casing.

11. A landing ring assembly for underwater installations wherein a casing with a casing head is set in the underwater formation comprising an elongated tube, means forming a ring on the exterior of said tube, caps on opposite ends of the tube, a hollow mandrel in said tube, said caps each having an opening therein, said mandrel having means on its opposite ends for securing tubing therein, means forming a shoulder on said mandrel, and bearing means between said shoulder and one of said caps, whereby the mandrel is made up in a tubing string and said ring is seated on a shoulder in said casing head while a downward force on the tubing string maintains the mandrel against the lower cap.

12. A landing ring assembly for underwater installations wherein a casing with a casing head is set in the underwater formation comprising an elongated tube, means forming a ring on the exterior of said tube, caps on opposite ends of the tube, a hollow mandrel in said tube, said caps each having an opening therein, said mandrel having means on its opposite ends for securing tubing therein, said tube being substantially longer than said mandrel, means forming a shoulder on said mandrel, and bearing means between said shoulder and one of said caps, whereby the mandrel is made up in a tubing string and said ring is seated on a shoulder in said casing head while a downward force on the tubing string maintains the mandrel against the lower cap.

13. A landing ring assembly for underwater installations wherein a casing with a casing head is set in the underwater formation comprising an elongated tube, a ring having a larger diameter than said tube, means for securing said ring coaxially on said tube, caps on opposite ends of the tube, a hollow mandrel in said tube, said caps each having an opening therein, said mandrel having means on its opposite ends for securing tubing therein, means forming a shoulder on said mandrel, and bearing means between said shoulder and one of said caps, whereby the mandrel is made up in a tubing string and said ring is seated on a shoulder in said casing head while a downward force on the tubing string maintains the mandrel against the lower cap.

14. A landing ring assembly for underwater installations wherein a casing with a casing head is set in the underwater formation comprising an elongated tube, means forming a collar on the exterior of said tube, caps on opposite ends of the tube, a hollow mandrel in said tube, said caps each having an opening therein, said mandrel having means on its opposite ends for securing tubing therein, said tube being substantially larger than said mandrel, means forming a shoulder on said mandrel, bearing means between said shoulder and one of said caps, and means on said mandrel forming an abutment facing oppositely of said shoulder, said abutment means having a greater diameter than the opening in the other of said caps and being spaced from said shoulder, whereby the mandrel is movable longitudinally of the tube and the abutment means engages said other cap for jarring the tube.

15. In underwater installations wherein a casing is set in an underwater formation, a casing cut-off tool assembly for running in a casing head having a substantially smaller diameter than said casing comprising a cut-off tool having a central axis, a nozzle on said tool, means for selectively displacing the nozzle radially of said central axis, bearing means on said assembly, means for receiving said bearing means in said casing head, said receiving means including means limiting longitudinal displacement of the bearing means relative to said casing head, and tubing interconnecting said bearing means and said cut-off tool, whereby the nozzle of the cut-off tool is positioned close to the central axis to allow the tool to pass through the casing head and then the nozzle is displaced away from the central axis inside the casing for cutting the casing while a downward force on the tubing string maintains the bearing means in said casing head.

16. A method of cutting casing in underwater installations of the type having a guide and anchor structure supporting a casing and casing head comprising guiding a tubing string having a cut-off tool thereon into said casing head, said cut-off tool having a nozzle adjustable radially of said tool, said nozzle being retracted while passing through said casing head, said tubing string having a landing ring and bearing means in the landing ring, seating the landing ring in the casing head, imposing a downward force on said landing ring, conducting jetting fluid to said nozzle and adjusting said nozzle radially outwardly adjacent the casing, whereby the cut-off tool passes through the casing head and is positively positioned with respect to the casing.

17. A method of accurately positioning a cut-off tool in a casing in underwater installations of the type having a guide and anchor structure supporting a casing head on the casing comprising assembling a tubing string with a cut-off tool and a tubing anchor swivel a predetermined distance above the tool, said swivel being slidably received in a tubular landing ring assembly, adjusting the axial position of said swivel relative to said tubular landing ring assembly, subsequently operating said anchor to secure said anchor rigidly at said adjusted position in said tubular assembly, guiding said tool into said casing head, seating said landing ring in said casing head, and imposing a downward force on said landing ring, whereby the depth of the tool is established with respect to the casing.

References Cited

UNITED STATES PATENTS

| | | | |
|---|---|---|---|
| 2,069,482 | 2/1937 | Seay | 175—269 |
| 2,275,946 | 3/1942 | Childers | 166—55.8 |
| 2,315,496 | 4/1943 | Boynton | 166—55 X |
| 2,743,087 | 4/1956 | Layne et al. | 175—285 |
| 3,081,828 | 3/1963 | Quick | 166—55 X |
| 3,137,348 | 6/1964 | Ahlstone et al. | 166—55.6 |
| 3,163,217 | 12/1964 | Haeber | 166—0.5 |
| 3,204,695 | 9/1965 | Murray | 166—88 X |
| 3,223,164 | 12/1965 | Otteman | 166—0.6 |

CHARLES E. O'CONNELL, *Primary Examiner.*

R. E. FAVREAU, *Assistant Examiner.*